April 22, 1952 — P. KOLLSMAN — 2,593,769
ENGINE FUEL INJECTION
Filed Dec. 11, 1945 — 2 SHEETS—SHEET 1
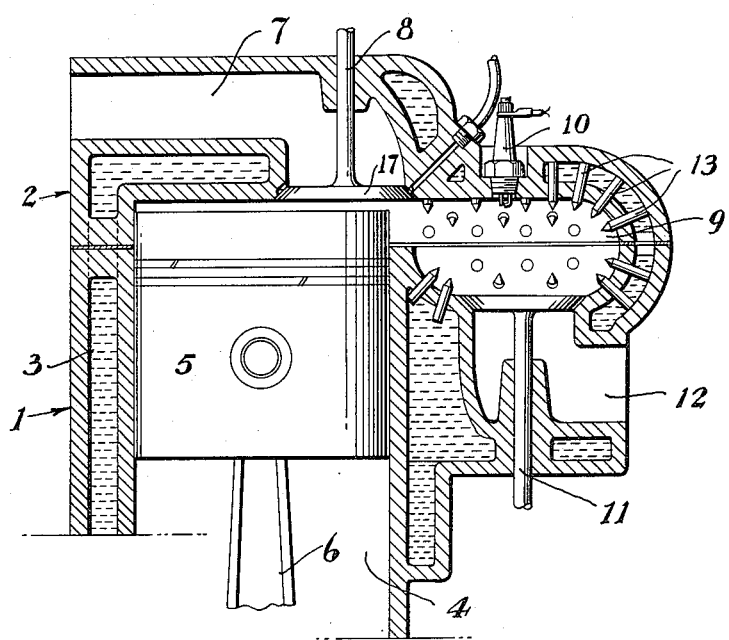
Fig. 1
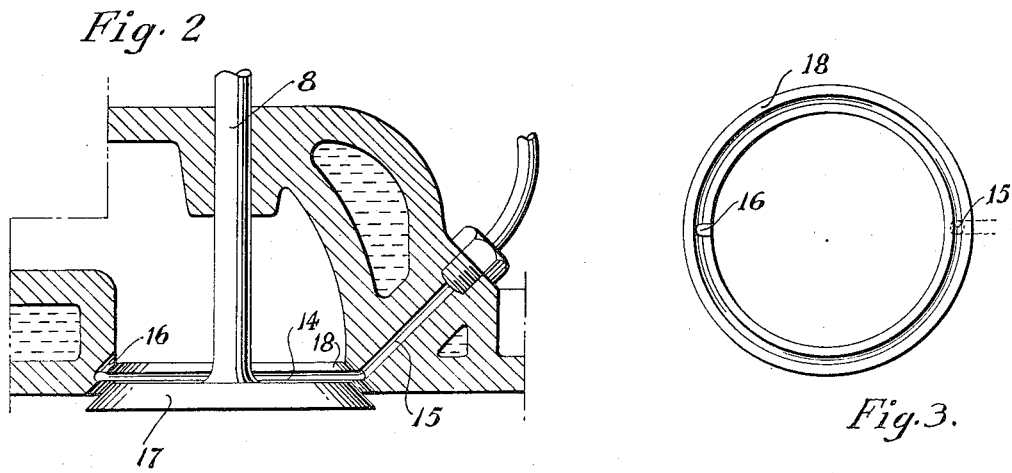
Fig. 2
Fig. 3.
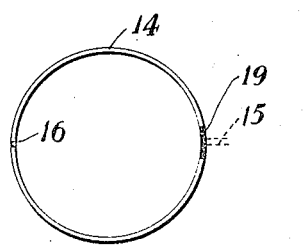
Fig. 4
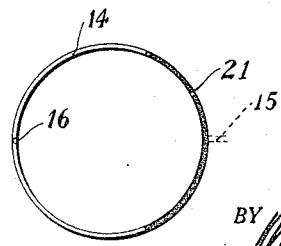
Fig. 5
INVENTOR.
PAUL KOLLSMAN Patented Apr. 22, 1952

2,593,769

UNITED STATES PATENT OFFICE 2,593,769

ENGINE FUEL INJECTION

Paul Kollsman, New York, N. Y.

Application December 11, 1945, Serial No. 634,276

3 Claims. (Cl. 123—34)

This invention relates to an internal combustion engine and more particularly to means for effecting thorough vaporization of the liquid fuel and for lessening the tendency toward detonation of the compressed fuel-air mixture upon ignition.

One object of the invention is the provision of an internal combustion engine in which the fuel is injected with the intake air at maximum velocity and turbulence.

Another object of the invention is the provision of an internal combustion engine in which the fuel is injected into the residual hot gases of combustion with a minimum of fresh intake air.

Another object of the invention is the provision of an internal combustion engine in which the vaporized fuel and air mixture is cooled after compression so that ignition is effected with the combustion gas at a lowered temperature.

Another object of the invention is the provision of an internal combustion engine in which swirling movement of the compressed combustion gas is braked at the conclusion of the compression stroke so that ignition is effected with the combustion gas at relatively low turbulence.

Another object of the invention is an internal combustion engine in which the fuel is thoroughly vaporized and the permissible compression ratio increased and/or octane number decreased without the occurrence of detonation of the combustion mixture.

Other objects and features of the invention will be readily apparent to those skilled in the art from the specification and appended drawing illustrating certain preferred embodiments in which:

Figure 1 is a partial sectional view through one cylinder of the internal combustion engine according to the present invention.

Figure 2 is an enlarged detail view of the intake valve and fuel injection means.

Figure 3 is a detailed view of the intake valve seat.

Figure 4 is a schematic view showing the fuel injection condition with the engine operating at low power.

Figure 5 is a view similar to Figure 4 but with a greater fuel consumption.

Figure 6:
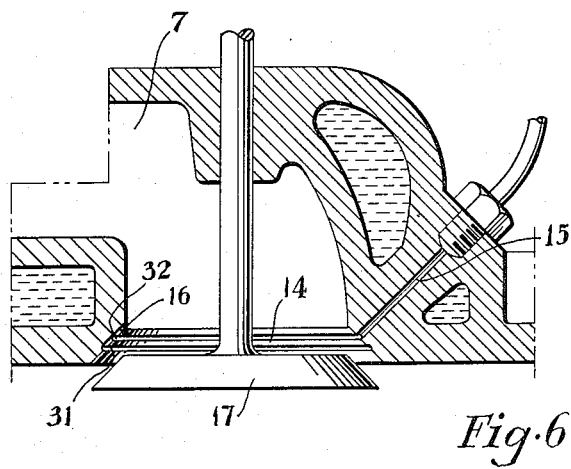
Figure 6 is a view similar to Figure 2 but showing a modified form of the invention.

As specifically illustrated, the engine comprises a block 1 and a head 2, double walled in conventional manner to provide space for a liquid coolant 3. Within the block 1 is a cylinder 4 in which reciprocates a piston 5 connected to a rod 6. Within the head 2 is an air intake passage 7 controlled by a valve 8. The walls of the engine block and head combine to produce a compression chamber 9 communicating with the upper end of cylinder 4. A spark plug 10 extends through the engine head into the combustion chamber 9. The exhaust from the chamber 9 is controlled by an exhaust valve 11 leading to exhaust passage 12. Through the walls of the chamber 9 extend a plurality of pins 13 of good conducting material, for example, copper, the pins 13 being in contact with the coolant 3 and extending into the chamber 9 into contact with the gas therein.

One feature of the invention lies in the manner in which the combustion fuel is injected into the engine cylinder. This includes the injection of the fuel with intake air at high velocity and turbulence and with the fuel injected into the hot residual gases of combustion with a small amount of air so that the temperatures of both the fuel and intake air are greatly increased. This higher temperature, together with the high velocity and turbulence of the air, effects a thorough vaporization of the fuel to insure its efficient combustion in the engine. To effect the fuel injection with a small amount of intake air at high velocity, it is preferred to introduce the fuel immediately adjacent the intake valve so that it will be carried along with the initially entering air while the valve is only partly open so that the restricted opening results in the air having a high velocity and turbulence. One manner of accomplishing this result is specifically illustrated in the drawing in the provision of a fuel passage in the intake valve seat. This is shown as an annular groove 14 in the valve seat with a fuel injection passage 15 communicating therewith. Opposite the passage 15, the intake part of the valve seat is provided with an air vent 16 for the venting of air from the groove as fuel is injected therein. The head 17 of the valve 8 contacts the surfaces of the valve seat 18 on the opposite sides of the groove 14 so that the groove becomes a substantially closed annular passage having only the fuel inlet and air vent connected thereto.

To further facilitate fuel vaporization, the valve seat 18 adjacent the inlet passage 15 is located as shown more particularly in Figure 1 at one side of the compression chamber 9 so that the incoming fuel will be injected into contact with the residual hot gases in the compression chamber. This inter-mixture of the incoming fuel and air with the hot gases in the combustion chamber is increased by the directional movement given to the incoming mixture by the conical surface of the valve head 17, which conical surface serves to direct the fuel and air into the combustion chamber as will be more particularly seen from an inspection of Figures 1 and 2.

The power which can be delivered by a given engine increases with the compression ratio at which the engine operates, but is limited by the tendency of the fuel-air mixture to detonate rather than burn if the compression ratio becomes too high. The permissible compression ratio may be increased by the use of higher octane number fuels, but this is limited not only by the fuel available, but also by the higher cost of the higher octane fuels. One of the features of the present invention lies in the provision of mechanical means permitting the use of the engine at higher compression ratios with the same octane number fuel, or the use of lower octane number, lower cost fuels with the same compression ratio, to secure efficient combustion of the fuel-air mixture without detonation.

As the piston 5 rises in the engine cylinder in the compression stroke, the vaporized fuel-air mixture, which is herein called the combustion gas, is transferred to and compressed in the combustion chamber 9. The chamber 9 is provided with curved walls as shown in Figure 1 so that the combustion gas entering the chamber will be given a swirling movement in the plane of the drawing. This swirling movement passes the compressed gas into intimate contact with the pins 13 which carry off the heat of compression to the coolant 3, with the result that the compressed gas at the end of the compression stroke is at a lowered temperature. While the piston 5 is forcing gas into the chamber 9, the swirling movement referred to will be effected against the frictional resistance offered by the pins 13. However, at the conclusion of the compression stroke, the pins 13 serve to immediately brake the movement of the gas so that at the conclusion of the stroke, the combustion gas will be at relatively low turbulence.

The detonation of the compressed gas is a function of its temperature and with a lower initial temperature there will be less tendency for the gas to reach detonation temperature before combustion is complete.

With the braking of the swirling movement of the gas at the end of the compression structure, the combustion takes place at low turbulence with lowered heat loss.

The disposition of fuel in the groove 14 in the intake valve seat is diagrammatically illustrated in Figures 4 and 5, with the engine of Figure 4 operating at low power with a small amount of fuel indicated at 19, and with Figure 5 showing operation at a greater fuel consumption shown at 21. In both cases it is seen that the fuel is disposed in the groove 14 adjacent the injection passage 15 so that as the intake valve 8 opens, the initial intake of air will carry the fuel from the groove 14 into the engine. Since this initial intake air passes through the restricted opening of the partially opened valve, the entering air will be at a high velocity and turbulence effecting a better mixture with the liquid fuel. By the location of the fuel injection side of the intake valve at the combustion chamber and the directional effect of the conical surface of the valve head 17, the fuel and air will be directed into the residual hot gases in the combustion chamber 9. As this initial entering air is of restricted volume, the fuel and air will be raised to relatively high temperature by the residual gases and the increased temperature together with the turbulence of the air effects efficient vaporization of the fuel.

In the modification of the invention shown in Figure 6, there has been added to the structure of Figure 2 a second annular groove 31 in the valve seat communicating by a vent opening 32 and the vent opening 16 with the intake passage. The groove 31 serves to collect and vent to the intake passage 7 any high pressure gases which might escape from the engine cylinder through the improper seating of the valve head 17 in the valve seat. With the single fuel injection groove of Figure 2, in the event of an improper seating of the valve, there is a possibility of high pressure gases passing into the fuel injection groove and expelling the fuel therein into the intake passage through the vent 16. With the provision of the vent groove 31 of Figure 6, any gases emerging from the engine cylinder will be collected and immediately vented to the intake passage 7 through the vents 32 and 16 without disturbing the fuel in the groove 14.

Figure 7:
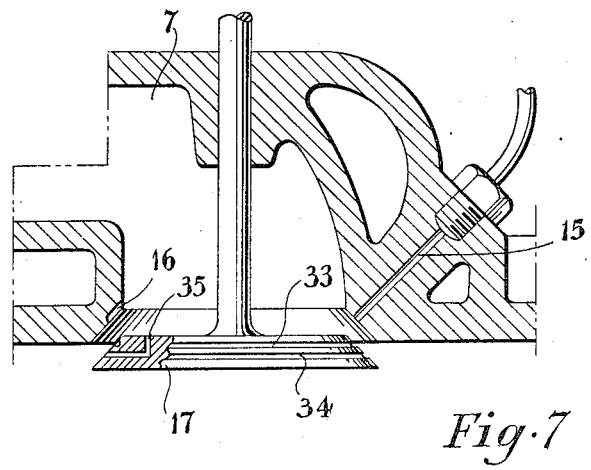
Figure 7 is a view similar to Figure 2 but showing a further modified form of the invention.

In the modification of the invention shown in Figure 7, the fuel injection groove 33, corresponding to the groove 14, and the vent groove 34, corresponding to the groove 31, have been placed on the seating surface of the valve head 17. The vent groove 34 now has the vent passage 35 through the valve head and extending into the intake passage 7. The function of the structure of Figure 7 is the same as that of Figure 6, but the location of the fuel and vent grooves in the valve head may in some instances be preferable due to the ease of forming and the facility with which the grooves may be cleaned and replaced. It will, of course, be understood that insofar as the function of the device is concerned, the location of the groove in the valve head or seat are equivalents and references in the claims to the location of the fuel groove and/or the fuel groove and vent groove in the valve seat are to be so construed.

The thorough vaporization of the fuel, the lowering of the temperature of the compressed fuel-air mixture, and the braking of gas movement to lower the turbulence in the combustion chamber all combine to produce an internal combustion engine of high efficiency and economy. However, each of these features is useable alone as well as in the combination to improve the operation of the internal combustion engine and applicant's invention contemplates the use of these features individually for increased efficiency as well as their use in combination to secure maximum engine performance.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In an internal combustion engine having a cylinder and a piston reciprocable therein, an intake valve at the end of an intake duct, through which valve combustion air and fuel are introduced into said cylinder during the intake stroke of the piston, and means for introducing said fuel immediately adjacent said intake valve so that the fuel will be carried along with the initially entering air while the valve is only partly opened and the air travelling at high velocity and turbulence, said fuel introducing means including an annular first groove in said intake valve seat into which liquid fuel is introduced, and a second vent groove in said valve seat on the cylinder side of the fuel introducing groove, said second groove communicating with said intake duct.

2. In an internal combustion engine having a cylinder and a piston reciprocable therein, an intake duct, an intake valve in said duct through which combustion air and fuel are introduced into said cylinder during the intake stroke of the piston, and means for introducing said fuel immediately adjacent said intake valve so that the fuel will be carried along with the initially entering air while the valve is only partly opened and the air travelling at high velocity and turbulence, said fuel introducing means including an annular endless first groove in said intake valve seat into which liquid fuel is introduced, and a second endless annular vent groove in said valve seat on the cylinder side of said fuel introducing groove for collecting and venting high pressure gases emerging from the engine cylinder, said second groove communicating with said intake duct.

3. In an internal combustion engine having a cylinder and a piston reciprocable therein, an intake duct, an intake valve in said duct through which combustion air and fuel are introduced into said cylinder during the intake stroke of the piston, said valve including a valve member and a valve seat having a pair of contacting sealing surfaces, and means for introducing said fuel immediately adjacent said intake valve so that the fuel will be carried along with the initially entering air while the valve is only partly opened and the air travelling at high velocity and turbulence, said fuel introducing means including an annular first groove in one of said sealing surfaces, a fuel inlet passage into said groove, an air vent leading from said groove, the groove forming an annular fuel chamber substantially closed except for the fuel inlet and air vent when said sealing surfaces are in contact, a second annular groove in one of said sealing surfaces on the cylinder side of said fuel introducing groove, and a vent leading from said second groove to said intake duct to exhaust engine gases leaking from the engine cylinder through the valve.

PAUL KOLLSMAN.

REFERENCES CITED

The following references are of record in the file of this patent:

UNITED STATES PATENTS

| Number | Name | Date |
| --- | --- | --- |
| 785,389 | Tuck et al. | Mar. 21, 1905 |
| 841,830 | Wackenhuth | Jan. 22, 1907 |
| 889,260 | Podlesak et al. | June 2, 1908 |
| 974,853 | Bock | Nov. 8, 1910 |
| 1,159,341 | Hobart et al. | Nov. 2, 1915 |
| 1,210,897 | Browne | Jan. 2, 1917 |
| 1,211,231 | Raabe | Jan. 2, 1917 |
| 1,603,659 | Breguet | Oct. 19, 1926 |
| 1,724,273 | Galasso | Aug. 13, 1929 |
| 1,802,848 | Summers | Apr. 28, 1931 |
| 2,061,826 | Bremser | Nov. 24, 1936 |
| 2,222,134 | Augustine | Nov. 19, 1940 |